(12) United States Patent
Uchida

(10) Patent No.: US 7,686,525 B2
(45) Date of Patent: Mar. 30, 2010

(54) PRINTING SYSTEM

(75) Inventor: Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/685,435

(22) Filed: Mar. 13, 2007

(65) Prior Publication Data

US 2007/0231038 A1  Oct. 4, 2007

(30) Foreign Application Priority Data

Mar. 31, 2006  (JP)  ............... 2006-098004

(51) Int. Cl.
*G03G 15/00* (2006.01)

(52) U.S. Cl. ............... 400/76; 399/75; 399/79

(58) Field of Classification Search ............ 400/70, 400/76, 61–63; 358/1.1, 1.15, 1, 15; 399/75, 399/79, 80, 85; *G03G 15/00*
See application file for complete search history.

(56) References Cited

U.S. PATENT DOCUMENTS

| | | | | |
|---|---|---|---|---|
| 5,251,044 | A * | 10/1993 | Ikegaya | ............ 358/440 |
| 6,005,637 | A * | 12/1999 | Suzuki | ............ 348/584 |
| 6,052,547 | A * | 4/2000 | Cuzzo et al. | ............ 399/79 |
| 6,701,099 | B2 * | 3/2004 | Yokobori et al. | ............ 399/45 |
| 6,796,730 | B2 | 9/2004 | Toda et al. | |
| 7,131,775 | B2 | 11/2006 | Uchida et al. | |
| 7,168,868 | B2 | 1/2007 | Uchida et al. | |
| 7,202,968 | B2 | 4/2007 | Uchida | |
| 7,230,730 | B2 * | 6/2007 | Owen et al. | ............ 358/1.14 |
| 2001/0056494 | A1 * | 12/2001 | Trabelsi | ............ 709/229 |
| 2003/0002063 | A1 | 1/2003 | Oomura et al. | |
| 2004/0141203 | A1 | 7/2004 | Honma | |
| 2005/0088701 | A1 | 4/2005 | Uchida et al. | |
| 2005/0231759 | A1 * | 10/2005 | Kamijima | ............ 358/1.15 |
| 2005/0275867 | A1 * | 12/2005 | Higashiura et al. | ............ 358/1.14 |
| 2006/0066907 | A1 | 3/2006 | Nakata et al. | |
| 2006/0082802 | A1 * | 4/2006 | Furuya | ............ 358/1.13 |
| 2006/0147236 | A1 | 7/2006 | Uchida et al. | |
| 2006/0170957 | A1 * | 8/2006 | Niebling et al. | ............ 358/1.15 |
| 2006/0187486 | A1 * | 8/2006 | Tsuchitoi | ............ 358/1.15 |
| 2007/0172281 | A1 * | 7/2007 | Inoue et al. | ............ 400/62 |
| 2007/0177212 | A1 | 8/2007 | Uchida | |

FOREIGN PATENT DOCUMENTS

| | | | |
|---|---|---|---|
| JP | 11085419 A * | 3/1999 | |
| JP | 2003150336 | 5/2003 | |
| JP | 2003-196046 | 7/2003 | |
| JP | 2004220532 | 8/2004 | |

\* cited by examiner

*Primary Examiner*—Judy Nguyen
*Assistant Examiner*—Wyn'Q Ha
(74) *Attorney, Agent, or Firm*—Fitzpatrick, Cella, Harper & Scinto

(57) ABSTRACT

A print controlling method in a print controlling apparatus for controlling printing processing by using printing limitation information indicating printing limitation, including an obtaining step of obtaining printing limitation information; an identifying step of identifying printing setting set to the printing data; a deciding step of deciding the printing setting by which the printing setting is within the printing authority information by using the printing setting identified at the identifying step and the printing authority information; a determining step of determining whether the printing setting decided by the deciding unit is inconsistent with the other setting set to the printing data; and an executing unit for allowing the printing setting for the printing data outside the range of the printing authority information if it is determined as inconsistent at the determining step, is disclosed.

3 Claims, 10 Drawing Sheets

EXAMPLE OF COMBINED USE SETTING OF
PRINTER DEVICE UNAVAILABLE

| OBJECTIVE FUNCTION | CONTENTS |
|---|---|
| TYPE OF MEDIUM | DUPLEX PRINTING IS UNAVAILABLE ON PARTICULAR MEDIUM SUCH AS OHP SHEET OR CARDBOARD |
| SIZE OF MEDIUM | DUPLEX PRINTING IS UNAVAILABLE ON SHEET OF PARTICULAR SIZE OR LESS |
| BOOKBINDING PRINTING | DUPLEX PRINTING IS UNAVAILABLE IF 2 UP PRINTING IS LIMITED |
| POSTER PRINTING | POSTER PRINTING IS UNAVAILABLE IF PRINTING LAYOUT OR SIMPLEX PRINTING IS LIMITED |
| DIGITAL WATERMARK | DIGITAL WATERMARK PRINTING IS UNAVAILABLE IF COLOR PRINTING IS LIMITED |
| ⋮ | ⋮ |

| USER NAME | PASSWORD | MAXIMAL NUMBER OF SHEETS | NUMBER OF SHEETS PRINTED | |
|---|---|---|---|---|
| User1 | Akd5sj4f | 500 | 123 | ~211 |
| User2 | saFjf98w | 1000 | 515 | ~212 |
| User3 | vGks9jg1a | 2000 | 1021 | ~213 |
| Guset | NONE | 0 | 0 | ~214 |

FIG. 10

EXAMPLE OF FUNCTION LIMITATION

| LIMITED ITEMS | LIMITATIONS |
|---|---|
| SIMPLEX PRINTING | ALLOWED/NOT ALLOWED |
| COLOR PRINTING | ALLOWED/NOT ALLOWED |
| PRINTING LAYOUT | NO LIMITATION/1 UP UNAVAILABLE/ 1 TO 2 UP UNAVAILABLE |

FIG. 11

EXAMPLE OF COMBINED USE SETTING OF PRINTER DEVICE UNAVAILABLE

| OBJECTIVE FUNCTION | CONTENTS |
|---|---|
| TYPE OF MEDIUM | DUPLEX PRINTING IS UNAVAILABLE ON PARTICULAR MEDIUM SUCH AS OHP SHEET OR CARDBOARD |
| SIZE OF MEDIUM | DUPLEX PRINTING IS UNAVAILABLE ON SHEET OF PARTICULAR SIZE OR LESS |
| BOOKBINDING PRINTING | DUPLEX PRINTING IS UNAVAILABLE IF 2 UP PRINTING IS LIMITED |
| POSTER PRINTING | POSTER PRINTING IS UNAVAILABLE IF PRINTING LAYOUT OR SIMPLEX PRINTING IS LIMITED |
| DIGITAL WATERMARK | DIGITAL WATERMARK PRINTING IS UNAVAILABLE IF COLOR PRINTING IS LIMITED |
| ⋮ | ⋮ |

PRINTING SYSTEM

BACKGROUND OF THE INVENTION

1. Field of the Invention

The present invention relates to a printing system for sending image data generated by a host computer to an image processing apparatus via an infrastructure such as a network and printing the image data on an actual sheet of paper.

The reduction of Total Cost of Ownership including not only an initial cost of installing a printer or a system but also a cost of consumables such as printing sheets or a coloring material such as toner have drawn much attention from the viewpoint of cost reduction in an office or preserving global environment. Conventional problems include that in the case where a printer is set in an office and can be accessed to a network, anybody can print maters by using the printer. In such a case, the printing limitation is not imposed on anybody and no footprint is left. As the user is not restrained, sometimes printing exceeding the originally required output limit is performed. That leads increased cost of the office.

2. Description of the Related Art

In order to address that, many units including the printing limitation by address information such as an IP address in the TCP/IP as a first unit, and the printing system that implements management of the number of print as it obtains the printing log as a second unit are realized. The first unit is quite rough method by which a particular IP address is limited, however, so that it cannot perform detailed management such as to limit the number of output by a particular user. According to the second unit, a log can be left by output but a great personal cost is required in examining whether unauthorized printing is performed or not by an administrator monitoring the log each time. That causes the unit to deviate from the purpose of reducing TCO. In order to solve the abovementioned problem, a user limitation function for limiting output for each user is proposed in the Japanese Patent Application Laid-Open No. 2003-150366.

On the other hand, some solutions are proposed for approaches for limiting various functions provided by a printer driver. For example, the Japanese Patent Application Laid-Open No. 2004-220532 refers to a method for disabling selection from the printing setting dialog screen of the printer driver as a method for performing a function limitation. As mentioned above, the available number of print is limited for each user or a function of the printer driver to be used when the printing is done in the host computer is limited in the conventional printing system. In such a conventional system, a main purpose has been such that the limitation of the limiting side is one-sidedly applied.

Conventionally, no exception of the printing setting is allowed for a user or a group of users to be limited. Therefore, when function limitation of the limitation system and a function desired by a user are inconsistent with each other, the operation was taken such that it is forcibly rounded to the setting at the limitation system side (imposed printing) or such that the printing is forbidden (printing stop) or the like.

Actually in such limitation system environment, as the printing function is excessively limited, the user's convenience is sacrificed.

If the imposed printing is executed, the printing is executed with the printing setting by prioritizing the limitation at the limitation system side. As a result, a printing result unexpected for the user is output. That increases the unwanted cost relating to sheets of paper or the other cost relating to the printing.

If the printing is stopped, function limitations at the limitation system side and a function desired by a user may inconsistent with each other. In such a case, the unwanted cost relating to the sheets of paper or relating to the printing can be prevented from occurring. The functions originally provided by the printing apparatus, however, may not be utilized. Further, meaningless setting or inconsistent setting may be imposed to the user. As a result, the user sometimes cannot have the result corresponding to the cost of installing the printing apparatus.

SUMMARY OF THE INVENTION

The present invention is adapted for solving at least one of the abovementioned problems. The first aspect of the present invention is to provide a flexible printing system for allowing particular setting if required in the system on which the printing limitation is imposed.

If setting set for the printing data is included in the range of the printing limitation imposed on the user and if the forced duplex printing setting is imposed to the user, it may hold true for the conflict conditions including conditions such that the duplex printing and OHP cannot be set at the same time. The second aspect of the present invention is to provide a system that enables the printing processing based on down-to-earth setting considering the conflict conditions even if the system on which the printing limitation is imposed.

Disclosed are a print controlling apparatus, method and a controlling program in the printing control apparatus for controlling printing processing by using printing limitation information indicating printing limitation, including an obtaining unit for obtaining printing limitation information, an identifying unit for identifying printing setting set to the printing data, a deciding unit for deciding the printing setting by which the printing setting is within the printing authority information by using the printing setting identified by the identifying unit and the printing authority information, a determining unit for determining whether the printing setting decided by the deciding unit is inconsistent with the other setting set to the printing data, and an executing unit for allowing the printing setting for the printing data outside the printing authority information if the determining unit determines it as inconsistent.

Other features and advantageous of the present invention will be apparent from the following description taken in conjunction with the accompanying drawings, in which like reference characters designate the same or similar parts throughout there of.

Further features of the present invention will become apparent from the following description of exemplary embodiments with reference to the attached drawings.

BRIEF DESCRIPTION OF THE DRAWINGS

FIG. 10 is a diagram illustrating an example of information required for identifying functional restriction in an embodiment of the present invention.

FIG. 11 is a diagram illustrating an example of a representative function implemented in a printer 403 and a printer driver 703 relating to a restriction example of a printing function shown in FIG. 10 in an embodiment of the present invention.

DESCRIPTION OF THE EMBODIMENTS

First Embodiment

Figures 1, 2:
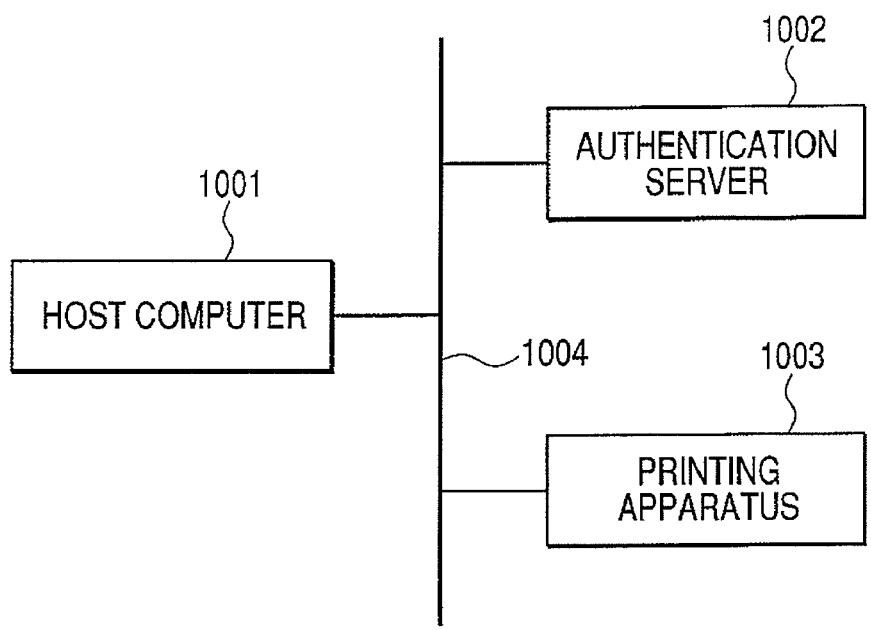
FIG. 1 is a diagram illustrating a conventional proposed configuration for implementing an output limitation function for a user.
FIG. 2 is a table illustrating a database storing authentication information and restriction information for each user saved in an authentication server 102.

FIG. 1 is a diagram for illustrating a precondition technique of the present invention. It is a diagram illustrating a configuration for implementing an output limitation function for each user.

In FIG. 1, the reference numeral 1001 denotes a host computer for a user to use for generating image data and printing. The reference numeral 1002 denotes an authentication server with authentication information and output limitation information by the user. The reference numeral 1003 denotes a printer for receiving printing data received via a network and printing on an actual sheet of paper by using such a printing technique as an electro-photography technique or an inkjet technique. The host computer 1001, the authentication sever 1002 and the printer 1003 are connected with each other via a network 1004 by such a technique as Ethernet (registered trademark).

FIG. 2 is a table illustrating a database for storing authentication information and restriction information for each user saved in an authentication server 1002.

In FIG. 2, each row indicates an entry from a user, describing authentication information and restriction information for each user. The reference numeral 201 denotes a user's name, 202 denotes a password, and 202 denotes the maximal number of sheets of paper the user can print in this month. The reference numeral 203 denotes the number of sheets of paper the user actually output this month. The password 202 describes a plaintext password for convenience of description, however, only a plaintext one-way hash value is actually stored for convenience of security so that the password is not leaked. Then, a method for authenticating by comparing the hash value with an input password hash value is taken. It is a matter of course that the database similarly can be read only with administrator's authority for convenience of security.

The row indicated by the reference numeral 211 denotes an entry by a user named User1. The password is a character string of "Akd5sj4f". The maximal number of sheets is 500, meaning that User1 is allowed to print up to 500 in a month.

The number of sheets printed is a value updated in a printer as a result of actual printing. User1 has printed 123 sheets of paper in this month. Similarly, in the reference numeral 212, User2 is defined and in the reference numeral 213, User3 is defined. The reference numeral 214 denotes the description by a guest user. The guest user has no password. The maximal number of sheets 0 indicates that the guest user cannot print at all. Whether the guest user is allowed or not depends on the system policy. Therefore, the database may or may not allow such a user.

When a user logs on the host computer 1001, the user inputs a user name and a password. The information is conveyed to the authentication server 1002, where the user name is compared with 201 and the password is compared with 202. If the authentication succeeds, the maximal number of sheets and the number of sheets printed are notified to the host computer 101. For example, if the user is successfully authenticated as User 1, the maximal number of sheets=500 and the number of sheets printed=123 are returned as returned values.

Figure 3:
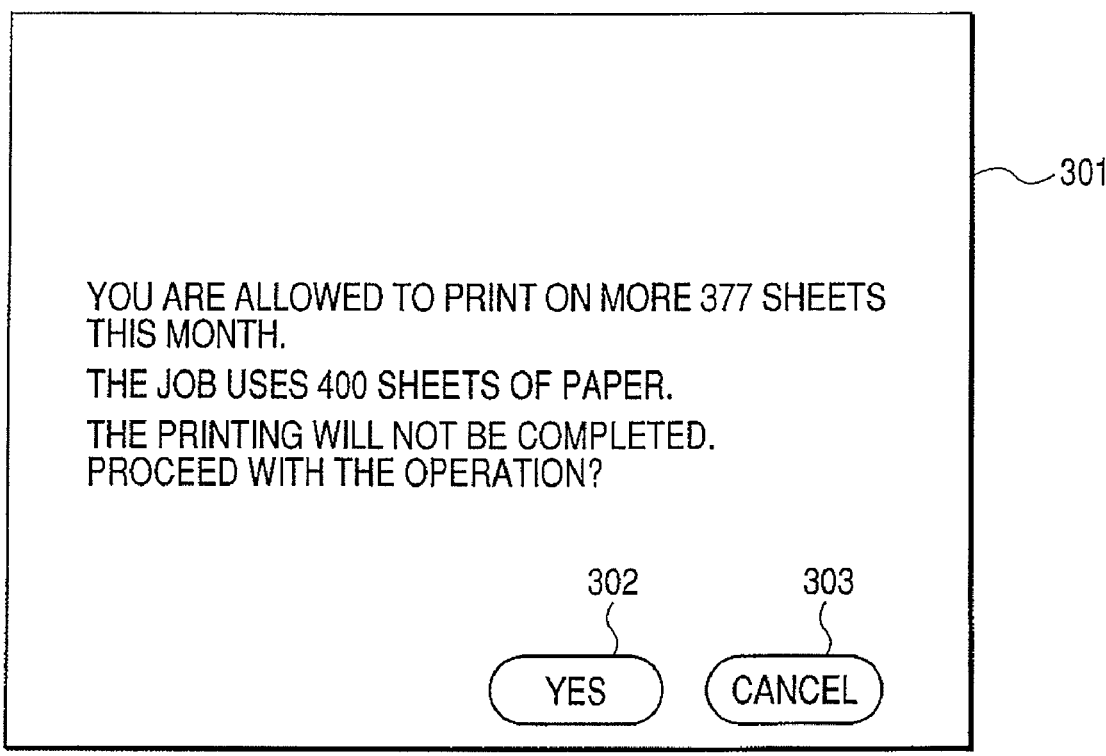
FIG. 3 is a GUI diagram of a dialog displayed by a printing driver when printing is to be done from a host computer 101.

When a printing job is actually done, the host computer 1001 takes account of the maximal number of sheets=500 and the number of sheets printed=123 and takes that 500−123=377 sheets can be printed, allowing printing if the number of sheets is up to 377. Or, if the number of sheets for the printing job is 400, exceeding the upper limit, the host computer 1001 warns the user to do some operations for it. FIG. 3 is a GUI diagram of a dialog displayed by a printing driver when printing is to be done from a host computer 1001. The reference numeral 301 denotes a dialog, 302 denotes a button to indicate to execute printing, and 303 denotes a button for canceling. When the reference numeral 302 is pressed, the host computer reduces the number of sheets to output for the printing job to 377 and executes printing. As the remaining 23 sheets are not output here, the user may not obtain a desired result of printing. When the reference numeral 303 is pressed, the host computer cancels the printing request so that no side effects occur.

Now, an embodiment according to the present invention will be described below. First, a specific example will be described by taking printing on OHP sheet media as an example. It is assumed that duplex printing is forbidden on the OHP sheet medium due to limitations at the printer side such as a sheet feeding and paper ejection mechanism or limitations on fixing or developing at the printing apparatus side. If the duplex printing is to be done on the OHP sheet by the printer driver, the printing is rounded up to simplex printing so that the user, an object of this example, is limited to use the simplex printing function by the limitation system.

If the user wants to print the matter on the OHP sheet, the user sets a printing media type to the "OHP sheet" from the host PC and performs printing as usual. Here, the printing side mode is rounded to the "simplex printing". As the "simplex printing" is forbidden by the limitation system, however, if the limitation of the limitation system (duplex printing) is prioritized, the printer driver or the printer processing causes the printing to be done what the media type is rounded up to the default setting (for example, plain paper). The printing is meaningless for the user who wants to print the matter on the OHP sheet because the printing is done on the plain paper, which means that a cost relating to useless sheets and printing occurred. It can be controlled not to execute the printing if it is set that the printing is unavailable as a result of prioritizing the limitations of the limitation system. For the objected user, it results in that the same effect as in the case where the printing is forbidden on the OHP sheets. If a great majority of users who uses the printer to do the printing is limited to use the printing function, the printing function is the OHP sheet printing function for a limited part of users to whom the simplex printing function is allowed. As such, the user may not obtain the effect corresponding to a cost of installing a printer that can print on the OHP sheet. Further, in an environment in which a user is surrounded by a plurality of users with various types of printing authority such as in an office, the user without the simplex printing authority request the user with the simplex printing authority to print the matter on the OHP sheet. That may cause a management cost to increase by such a reason of a printing result on the OHP sheet needs to be obtained so that such a task as originally unwanted in the client and the client's job.

Figure 4:
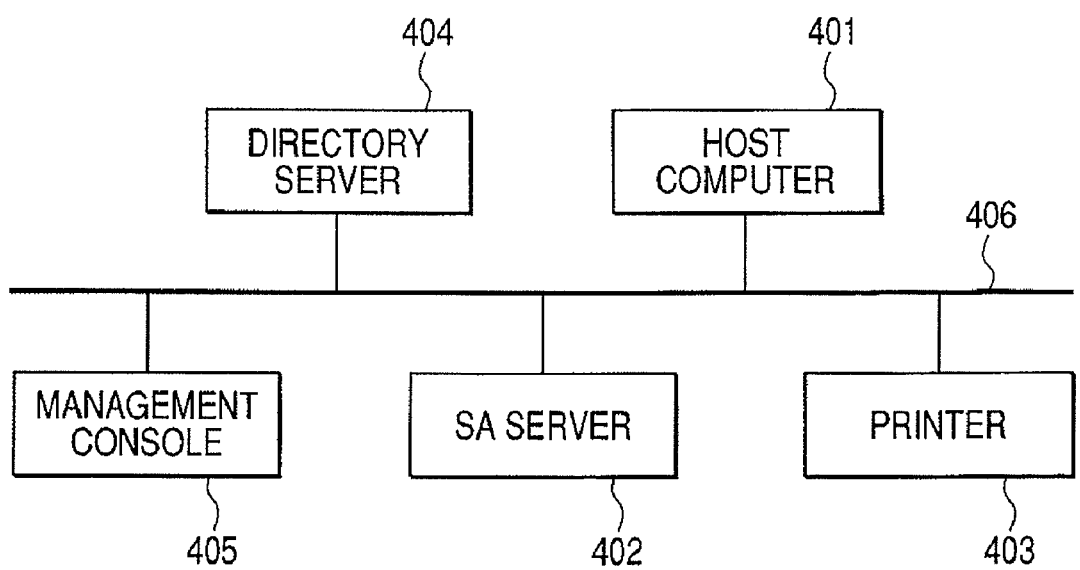
FIG. 4 is a block diagram illustrating a configuration of a printing system in an embodiment of the present invention.

In the abovementioned specific example, printing on the OHP sheet is exemplified, though, there are many other combinations that cannot be allowed from the viewpoint of the mechanisms of the printer. The combination of setting that cannot to be allowed differs for the printer to output the matter. It is a matter of fact that the same circumstance as in the abovementioned example occurs in the respective examples. FIG. 4 a block diagram illustrating a configuration of a printing system in an embodiment of the present invention.

Figure 14:
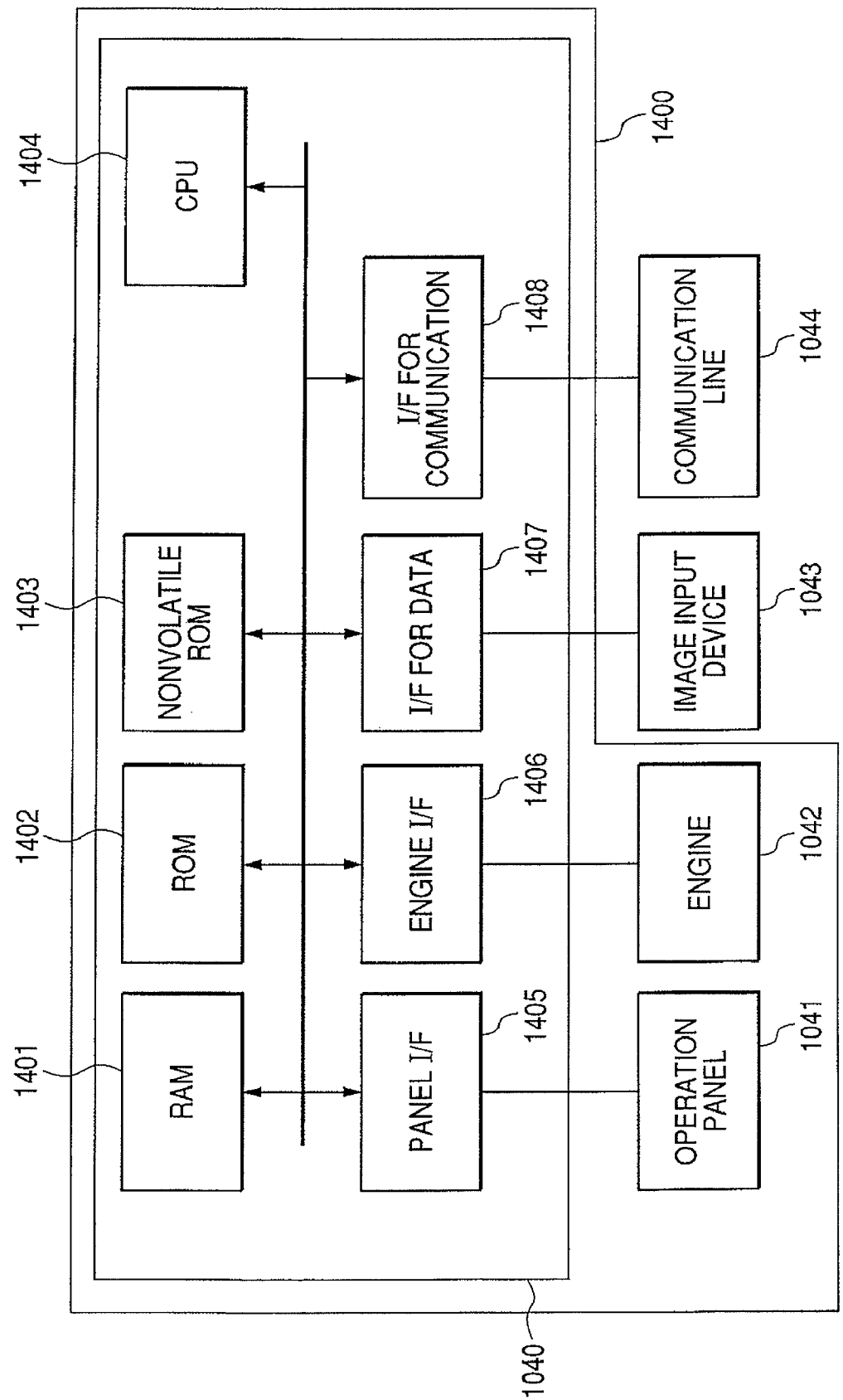
FIG. 14 is a diagram illustrating an image forming apparatus in anther embodiment of the present invention.

In FIG. 4, the reference numeral 401 denotes a host computer for generating and printing image data. The reference numeral 402 denotes a SA (Security Agent) server for distributing printing authority token to the host computer. The reference numeral 403 denotes a printer for receiving printing data received via a network, and printing the matter of an actual sheet of paper with a printing technique such as the electro-photographic technique or the inkjet technique. The inner configuration of the printer 403 is also shown in FIG. 14. The reference numeral 404 denotes a directory server mounted with a printing function limitation information database that originates to generate a printing authority token. The reference numeral 405 denotes a management console, which is a computer to manage the database of the directory server 404. The host computer 401, the SA server 402, the printer 403, the directory server 404 and the management console 405 are connected with each other via a network 406 with the Ethernet technique (registered trademark). Those denoted by the reference numerals 401 and 405 may be implemented in a single computer. Some functions among the functions mounted to those denoted by 401 and 405 may be mounted on a single computer.

Figure 6:
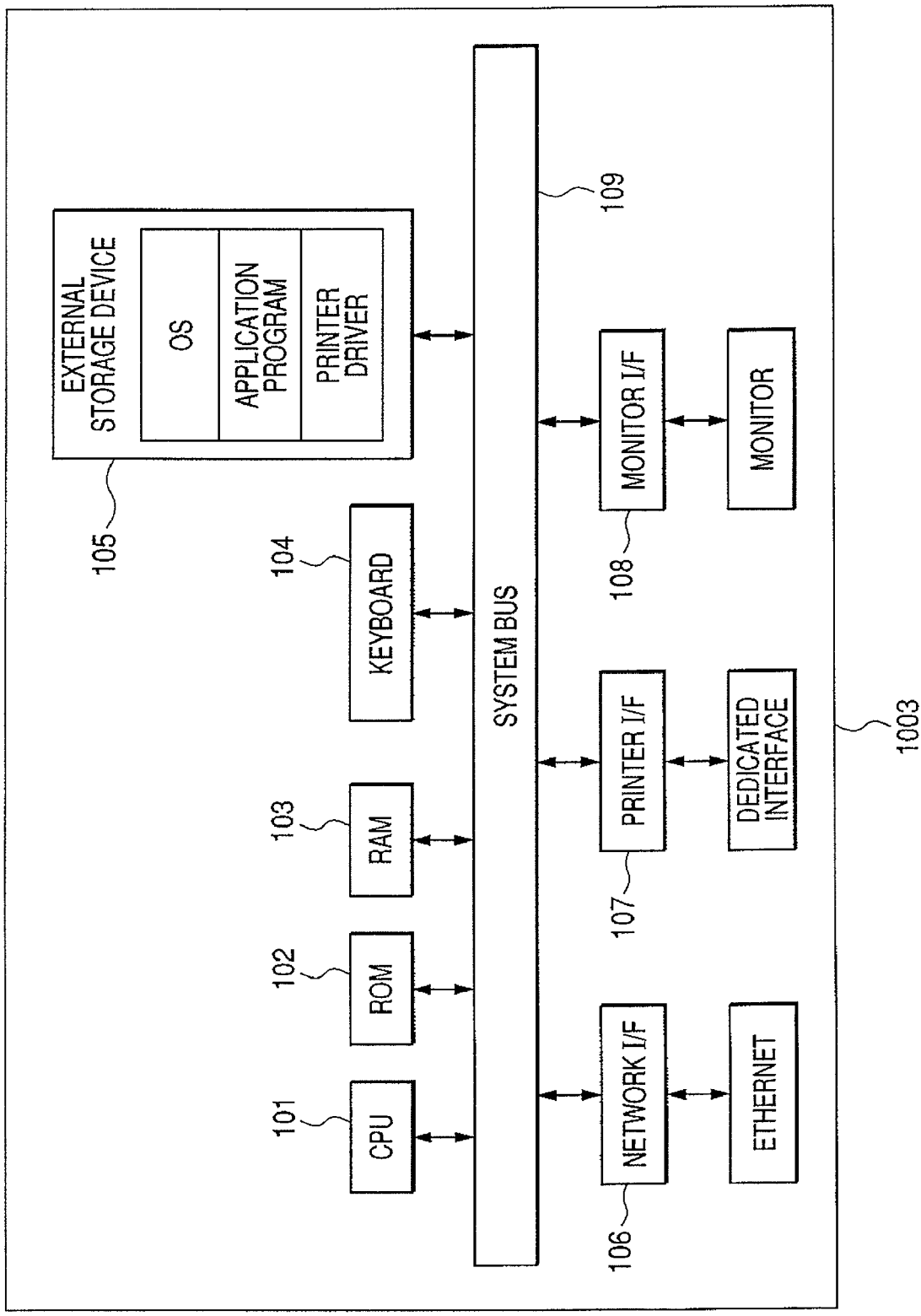
FIG. 6 is a block diagram illustrating an inside system of a host computer 401 in an embodiment of the present invention.

FIG. 6 is a block diagram illustrating an inside system of the host computer 401, which is a general computer. The CPU 101 controls over the apparatus according to the program stored in a ROM 102, a RAM 103 or an external storage device 105. The RAM 103 is used as an actual work area for the CPU 101 to perform various types of processing. The external storage device 105 records an operating system (OS), an application software program, or a printer diver software program. The input device such as a keyboard 104 or a mouse (not shown) is a device for a user to give various indications. A network I/F 106 and a printer I/F 107 are interfaces for connecting with a laser beam printer 30 via the Ethernet (registered trademark) or a dedicated interface and exchanging data. A monitor I/F 108 is an interface for connecting with a monitor and transferring display data. The monitor I/F 108 displays a user interface for an application program or a printer driver. The reference numeral 110 denotes a common data bus. An application software program is executed by the CPU 101 and controls the operations of the computer denoted by the reference numeral 401.

Figure 7:
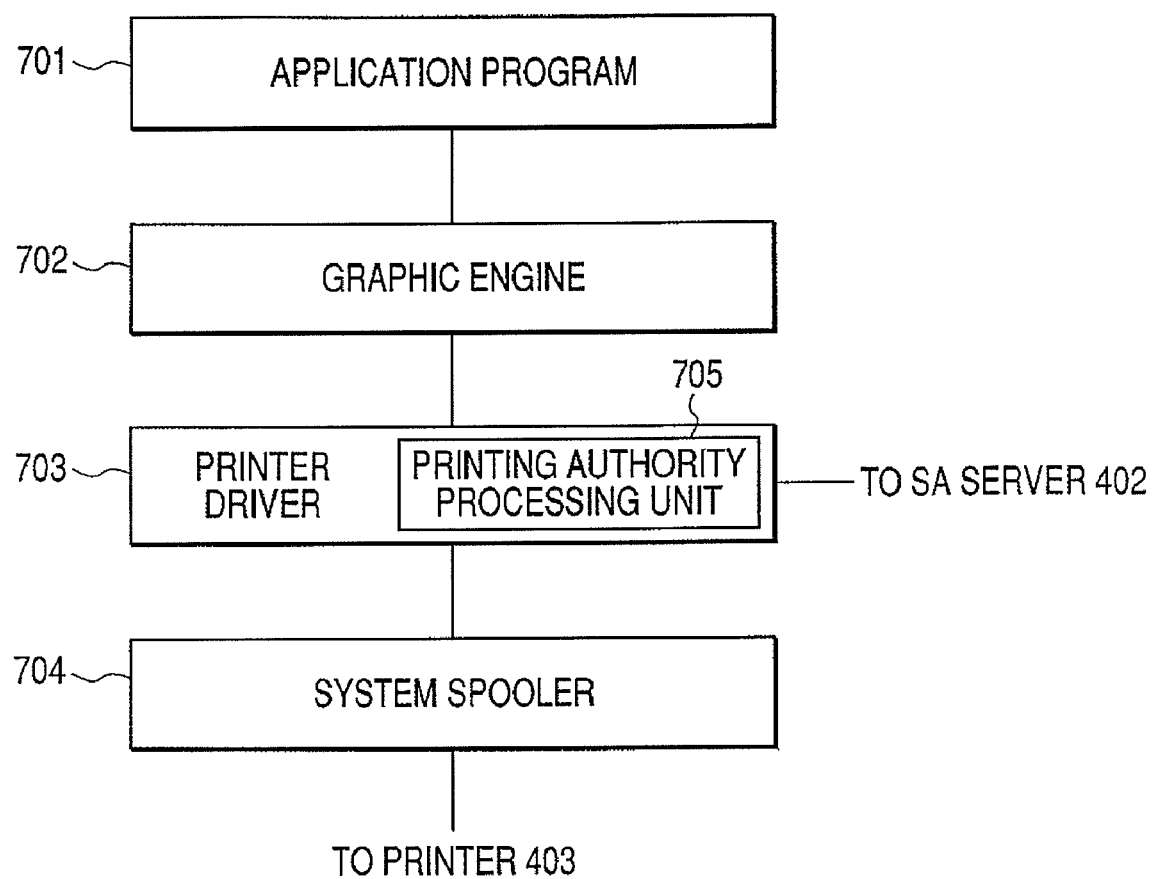
FIG. 7 is a block diagram illustrating a detailed configuration for print processing in a host computer 401 in an embodiment of the present invention.

FIG. 7 is a block diagram illustrating a detailed configuration for print processing in a host computer 401. The host computer 401 corresponds to the host computer 1001 of FIG. 1. The authentication server 1002 is also a similar hardware configuration, except for a function of an application program mounted thereto. An application program 701, a graphic engine 702, a printer driver 703 and a system spooler 704 are present as files saved in an external memory 11. They are program modules loaded on the RAM 2 by a module using the OS or the module of the OS and executed there. The application program 701 and the printer driver 703 can be added to an FD of the external memory 11, a CD-ROM (not shown) or an HD of the external memory 11 via a network (not shown). The application program 701 saved in the external memory 11 is loaded on the RAM 2 and executed. When printing is done from the application program 701 on the printer 403, the application program is similarly loaded on the RAM 2 and performs output (drawing) by using an available graphic engine 702. The graphic engine 702 loads a printer driver 703 prepared for each printer such as a printer from the external memory 11 to the RAM 2 and sets the output of the application program 701 to the printer driver 703. The graphic engine 702 converts a GDI (Graphic Device Interface) function received from the application program 701 into a DDI (Device Driver Interface) function and outputs it to the printer driver 703. The printer driver 703 converts it into the PDL data, which is a control command that can be recognized by a printer, based on the DDI function received from the graphic engine 702. It is adapted that the converted PDL data is output to the printer 403 via the interface 21 through a system spooler 704 loaded by an OS on the RAM 2 as a printing job.

Figure 8:
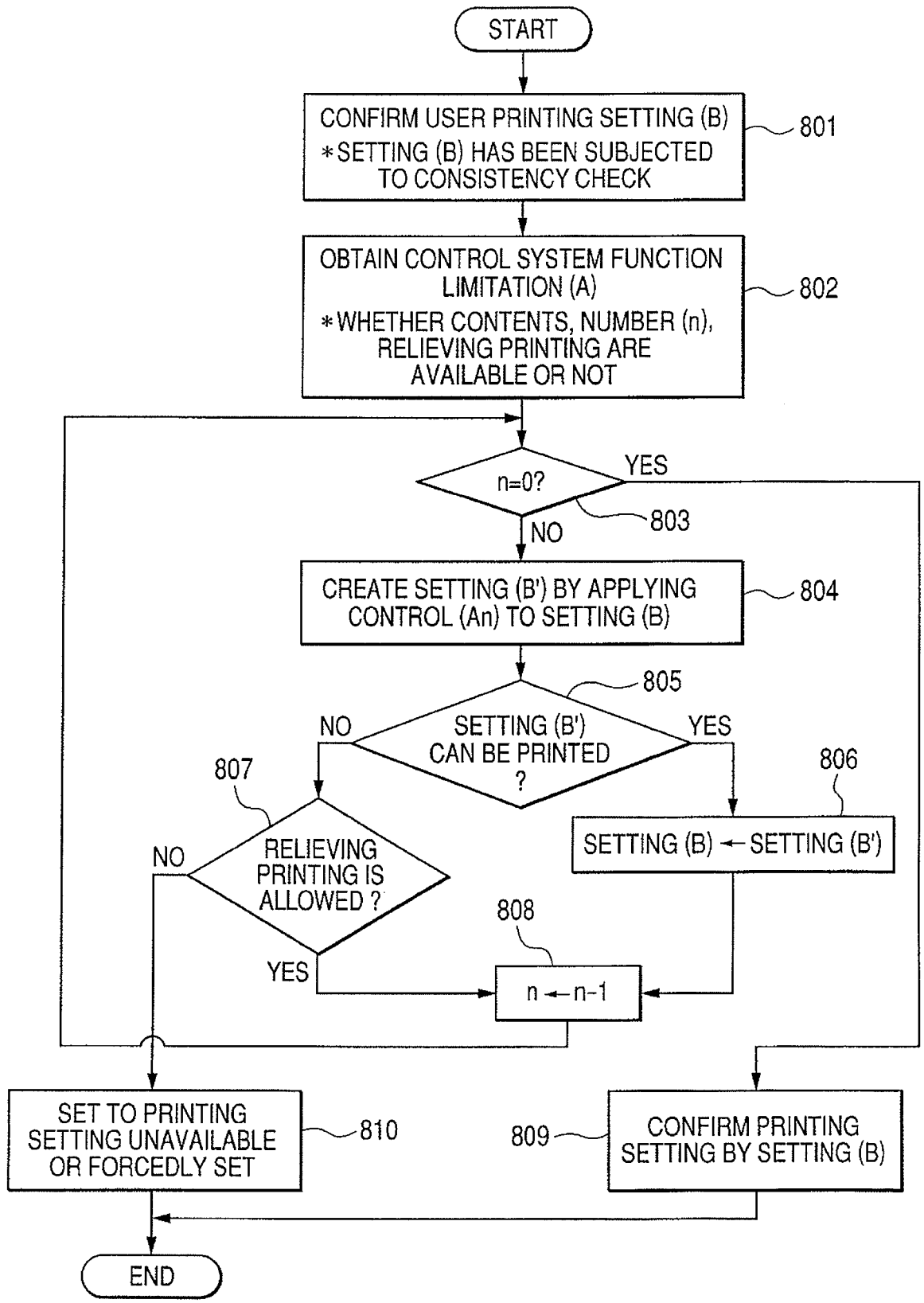
FIG. 8 is a diagram illustrating a detailed flow when printing is set in an embodiment of the present invention.
Figure 9:
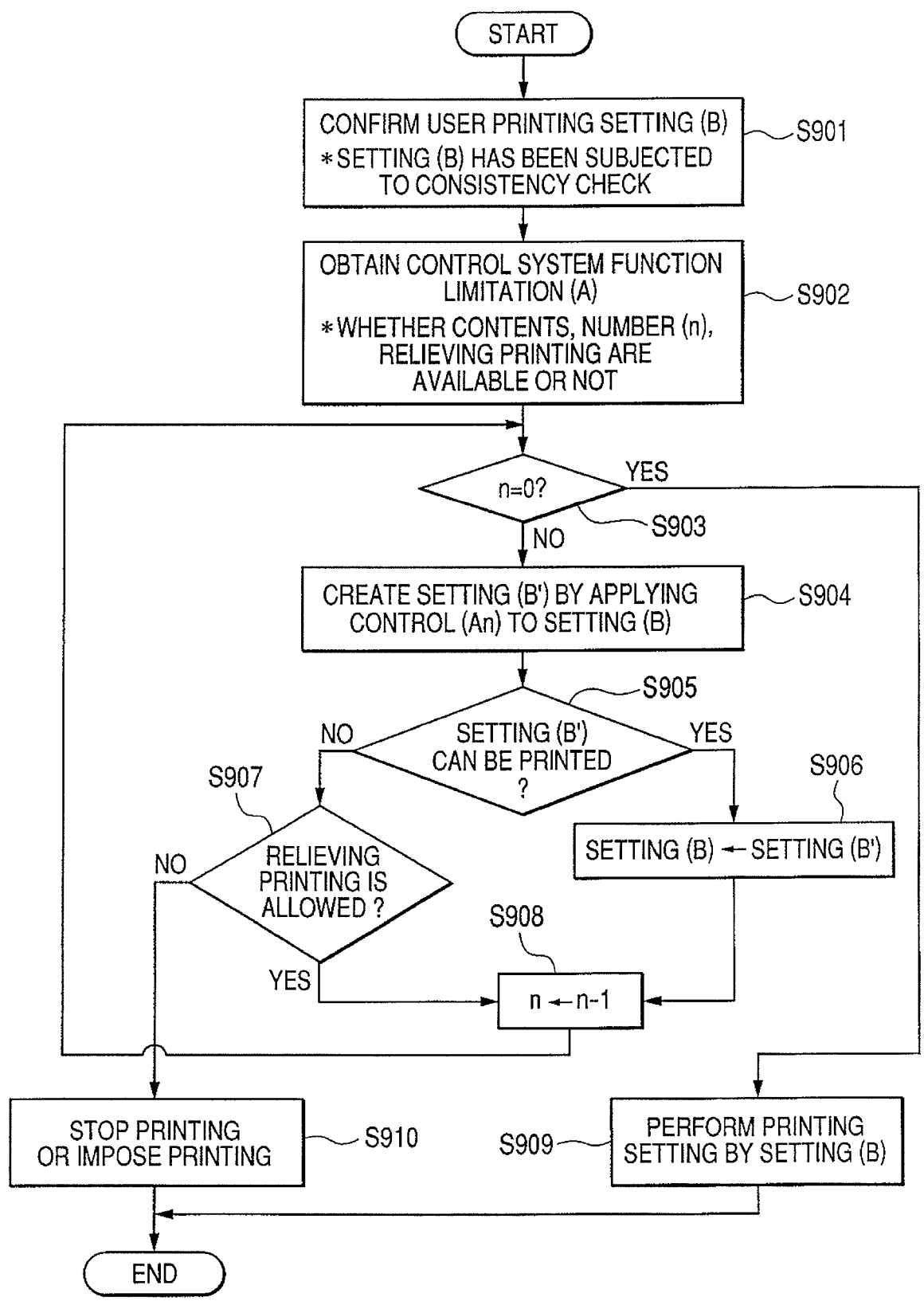
FIG. 9 is a diagram illustrating a detailed flow when printing is performed in an embodiment of the present invention.

The printing system of the embodiment has a printing authority processing unit 705 in the printer driver 403. The printing authority processing unit 705 may be a build in module of the printer driver 703 or may be in a form of a library module to be added by an individual installation. When the printer driver 703 is executed for printing, the printing authority processing unit 705 is loaded by a printer driver. As the printing authority processing unit 705 is loaded, it collects information required for printing function limitation on the host computer 401 and sends the information to the SA server 402. Then, the printing authority processing unit 705 receives a printing authority token from the SA server as a response. The printer driver 703 creates the PDL data according to the printing authority token received by the printing authority processing unit 705 and sends it to the system spooler 704. The printing job including the PDL data is output to the printer 403 as a printing job via the interface 21 through the system spooler 704 as mentioned above. That is to say, processing described in FIGS. 8 and 9 is run according to the printing instruction. The jobs with printing setting that is subject to the processing in FIGS. 8 and 9 may be generated by the printer driver 703 as mentioned above.

Figure 5:
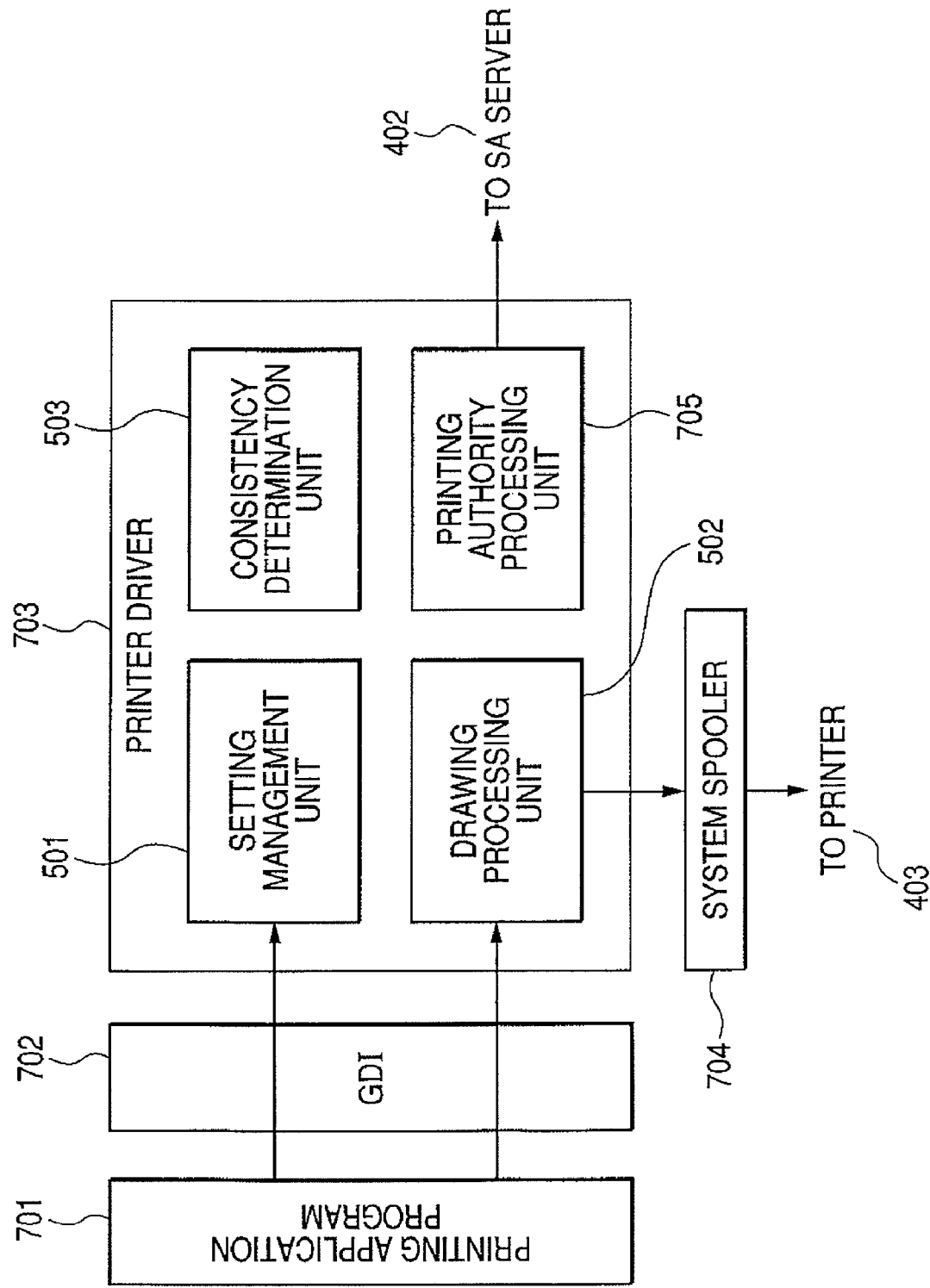
FIG. 5 is a block diagram illustrating a configuration inside a printer driver 703 of an embodiment of the present invention in detail.

FIG. 5 is a block diagram illustrating a configuration inside the printer driver 703 of FIG. 7 in detail.

A setting management unit 501 serves to manage setting relating to printing, creating printing setting information relating to the printer 403 to print according to a request of printing setting from the printing application program 701 and returns it. The setting management unit 501 also saves a GUI for printing setting and provides the GUI as a unit for changing printing setting to a user via the application program 701.

A drawing processing unit 502 serves to generate a printing job. Then, it interprets printing setting information and drawing information passed from the printing application program 701 via the GDI 702. It converts the information into the PDL in a form that can be understood by the printer 403 to print the matter and issues the printing job to the printer 403 via the system spooler 704.

A consistency determination unit 503 checks whether an acceptable combination of printing setting occurs or not by checking consistency for each of printing setting items described in the printing setting information for printing setting information treated by the setting management unit 501 and the drawing processing unit 502. It is assumed that at least two types of processing can be indicated for the consistency checking. The first one is processing for only executing determination on the consistency simply checking the consistency (consistency determination processing). The second is processing for creating printing setting information that is consistent in accordance with the priority of the setting items defined separately and a defined value for the setting items (setting rounding processing) when it is determined as inconsistent after checking for consistency is done.

The printing authority processing unit 705 sends information required to obtain a printing authority token to the SA server 402 and receives the printing token from the SA server 402 as mentioned above. The SA server stores printing authority token information to be sent for each user. The SA server obtains the user information corresponding to printing issuer who is sent from the printing authority processing unit. The printing authority processing unit 705 sends this information to the SA server. The SA server communicates with the directory server 304 and checks whether the user is an authorized user or not. Specifically, the SA server sends user information including a combination of a password, a user ID, and domain name to the directory server. The directory server informs the SA server whether the user is authorized or not based on the user information. When the SA server receives the information on whether the user is authorized or not from the directory server, it obtains printing authority token information corresponding to the user. It sends the obtained printing authority token to the printing authority processing unit.

It is assumed that information indicating whether information required for identifying function limitation indicated in FIG. 10 and information on whether relieving printing to be described later is to be executed or not are described in the printing authority token in the embodiment.

First, the function limitation of FIG. 10 will be described. The simplex printing limitation indicates whether or not to allow the matter to be printed only on the one side of the printing media or not. If it is not allowed, the printing is done on both sides of the printing medium (the front side and the back side) so that a cost of a printing media can be reduced.

A color printing limitation indicates whether or not to allow the color printing. If it is not allowed, only monochrome printing is done so that a cost of ink or toner or a charge for color printing can be reduced. Printing layout limitation indicates limitation in the case where there are limitations for the presence of limitations for NUP printing. In the embodiment, three values below can be set.

The NUP printing means a function for reducing printing data for N pages and arranging it into a page. The value N is a value that can be represented by n×m (n and m are an integer of 1 or more) such as 1 (1×1), 2(1×2), 4 (2×2), 6 (2×3), 8 (2×4), 9 (3×3), 16 (4×4). For example, 1UP means to arrange information for one page on a sheet of paper. 2UP means a layout to arrange information for two pages on a sheet of paper. Under "No limitation", no printing limitation is done for any printing layout. Under "1UP unavailable", only 1UP printing is unavailable, leaving printing of 2UP or more being allowed.

Under "1 to 2UP unavailable", 1UP, 2UP printing is made unavailable, leaving printing of 4UP or more being allowed.

Now, the relieving printing that is the center of the present invention will be described. The relieving printing means a printing method that temporally relieves function limitations of the limitation system to print and performs the printing processing when function limitations defined by the limitation system to print is applied and the printing becomes unavailable due to the other limitations. It is assumed that the printing authority processing unit 705 also obtains information on whether or not to perform the relieving printing from the SA server 402.

FIG. 8 is a diagram illustrating a detailed flow when printing is set in the present invention.

Referring to the figure, processing in the case where printing setting information is requested from the application program 701 to the setting management unit 501 will be described.

The step S801 is a step for confirming printing setting by a user.

Here, it is assumed that the application program 701 changes the printing setting information by itself. In such a case, a GUI for printing setting is displayed according to actions for creating printing setting information that the printer 403, which received the changed setting information and output it, can process or an instruction by the application program 701, and changing of the printing setting is received by the user. The action for creating printing setting information for the printer 403 to output the matter to be able to process is performed.

In either case, printing setting information ("setting B") that can be processed by the printer 403 to output it by using the consistency determination unit 503 inside it is created in the embodiment. The "setting B" created here is saved in a storage region as the "setting Bo" for the steps afterwards.

In the step, printing setting information ("setting B") that can be processed by the printer 403 to output is created with an API of the printer driver.

At the step S802, information for identifying printing function limitation from the printing authority token obtained from the SA server 402 ("limitation A") and information on whether or not to perform the relieving printing is generated with the printing authority processing unit 705. The number of limited items that is limited is calculated and saved as "n" in a work area.

If the "limitation A" is the valid number of limited items ("n") (n is an integer of 0 or more) that may include a plurality of limited items as shown in FIG. 10, each of the limited items is described as "An" (n=1, 2, 3, . . . ) in the embodiment.

At the step S803, whether the number of valid limitation items ("n") is 0 or not is checked.

If n is 0, the operation proceeds to the step S809; and if n is not 0, the operation proceeds to the next step S804.

The step S804 is a step for creating printing setting information applied with one of the limited items. That is to say, the "setting B'", which is a limited item "An" applied to the "setting B", is created in the work area.

If the simplex printing is "unavailable" as shown in FIG. 10, the "setting B'" that the "setting B" whose printing side mode is replaced by "duplex printing" is created.

The step S805 is a step of determining whether printing setting information, to which one of the limited items created at the step S804 is applied, can be set as available for printing.

At this step, the consistency determination processing of the consistency determination unit 503 is called by using the previously created "setting B'". If it is determined that a value of "it is consistent" is returned from the consistency determination unit 503 as a result, the operation proceeds to the step S806. If it is determined that a value of "it is not consistent" is returned, the operation proceeds to the step S807. That is to say, at the step S805, the presence of the consistency is determined by using the determination of the consistency determination unit.

As it is determined that printing setting information to which one of the limited items created at the step S804 is consistent at the step S806, processing fort temporally making the setting the printing setting information is performed. That is to say, the contents of the "setting B'" is copied to the "setting B". Then, the operation proceeds to S808.

At the step S807, it is determined whether the abovementioned relieving printing processing is allowed or not. For the determination, flag information based on input from a user interface of the printer driver or input from the external file is used. The flag showing a setting of whether or not to allow the relieving printing is read at the step S802, and the printing authority processing unit performs the determination.

It is determined whether the relieving printing is allowed or not by using the flag information previously obtained at the step S802. At S802, if it is determined that it is allowed, the operation proceeds to the step S808. The printing setting information setting processing is kept. That is to say, the contents of the "setting B'" is written in the "setting B".

If it is determined that the relieving printing is not allowed at S807, the operation proceeds to the step S810. At S810, the fact that printing setting is unavailable or that printing setting is forced is notified to the user. The processing for reflecting one of the limitation items ("An") on the printing setting information has been done.

If it is determined that the printing setting information ("setting B'") is consistent at the step S805, the limitation item ("An") is reflected; and if it is determined that the information is not consistent, the limitation item ("An") is not reflected.

At the step S808, processing for proceeding to the next objective limitation item is performed.

That is to say, the value subtracted 1 from the value "n" is newly made the value "n", and the operation returns to the step S803.

At the step S809, processing for returning the printing setting information ("setting B") confirmed through the processing as information that can be set for printing to the requested application program 701.

Here, a message for notifying the setting item for the difference between the "setting Bo" and the "setting B", i.e., the setting item forced by the printing function limitation system may be displayed to the user.

The processing in the case where no effective setting can be built as the printing setting information is performed as a result of the processing at the step S810. For example, a message indicating that limitation of the printing function limitation system prevents the printing is displayed to the user, and the "setting Bo" previously saved at the step S801 is returned to the application program 701. Alternatively, the printing setting information (setting Ba) to which all the function limitation (A1, A2 to An) is reflected on the "setting Bo" is created. Then, that information may be returned to the application program 701 as the printing setting information. At the same time, a message for notifying the difference setting items between the "setting Bo" and the "setting Ba", i.e., the setting items limited by the printing function limitation system may be displayed to the user.

The processing for creating printing setting information has been described. At S810, the processing may be finished by canceling the job.

It will be described with reference to the specific example. It is assumed that the printing authority managed by the SA server is set as unavailable for the simplex printing (i.e., forced duplex printing) for a user A. Here, it is assumed that it is set as relieving printing available, i.e., flag is set to 1, for a driver. It is also assumed that relieving printing for the duplex printing is allowed when inconsistency occurs.

First, it is assumed that a user specifies simplex printing setting and media of the OHP sheet, confirms the setting and issues the printing instruction to the job (S801). Then, the relieving printing flag input into the driver is read at S802. For simplicity, it is assumed that only the OHP setting and the simplex setting are set. Here, as the OHP is not limited, it is not subjected to the processing of FIG. 8, and the setting is kept. Therefore, N=1, and the processing of FIG. 8 is executed for the duplex printing setting (NO at S803). Here at S804, the simplex printing setting is limited by the token shown in FIG. 10 as mentioned above. At S804, the duplex printing is prepared as the setting B'. Here, the printing authority processing unit calls the consistency determination unit with setting values of OHP and duplex printing as input values.

The consistency determination unit keeps a conflict rule as shown in FIG. 11. The consistency determination unit detects that it is against a rule that a media including an OHP sheet and a cardboard are unavailable for the duplex printing as shown in FIG. 11. The consistency determination unit notifies the printing authority processing unit of that the OHP sheet and the duplex printing are not consistent and finishes the processing. The printing authority processing unit performs the determination at S805 based on information returned from the consistency determination unit. Here, the printing authority processing unit determines that it is set as the duplex printing and the OHP are not consistent, and it is determined No at S805. The operation proceeds to S807. Next at S807, it is determined that the relieving printing of the duplex printing that is determined as inconsistent is allowed or not. The user is made previously input a table defining whether the relieving printing is allowed or not. The processing at S807 is determined based on the table. At S807, as the table is defined as mentioned above, it is determined that the relieving printing of the duplex printing under the inconsistent state is allowed. At S807, the duplex printing is relieved, the simplex printing is kept as the setting B, and the processing is finished. If the processing of the duplex printing is forced, the duplex printing is absolutely forced on the OHP. In such a case, it is desirable that warning is notified to the user or the administrator. Further, the job may be cancelled. In the embodiment, the OHP and the duplex printing have been described. A combination of the duplex setting and bookbinding setting can be considered similarly. In the case of bookbinding, the duplex printing is relieved. A combination shown in FIG. 11 may also be considered. If the duplex printing is set, the duplex printing may be relieved for the size of a particular size or less. The bookbinding of FIG. 11 cannot be implemented if only any one of the duplex printing and 2UP printing is limited to unavailable. Therefore, if it is requested to allow bookbinding printing, it can be set to perform the relieve printing so that both 2UP and duplex printing are allowed as the relieving printing.

Next, the operations in printing will be described.

FIG. 9 is a diagram illustrating a detailed flow when printing is performed of the present invention.

With reference to the drawing, the processing in the case where drawing information is passed with the printing setting information from the application program 701 to the drawing processing unit 502 will be described.

As it is apparent from the drawing, as the processing flow is almost the same as that in the printing setting is (FIG. 8), the processing part specific to that in printing will be mainly described. First the flow shown in FIG. 8 in the printing setting is implemented. If the printing setting information created along that flow is passed to the drawing processing unit 502, the processing relating to the present invention needs not to be done in the printing setting. In some printing flow of the application program 701, the printing setting information is uniquely rewritten by only inputting default setting from the printing setting management unit 501 and the printing setting information is passed to the drawing processing unit 502. In such a case, it is assumed that almost the same processing as that in the printing setting is implemented in the printing.

The step S901 is a step for confirming the printing setting of the user.

Here, the printing setting information passed from the application program 701 is passed to the consistency determination unit 503, and the printing setting information ("setting B") that the printer 403 to output can process is created.

The "setting B" created here may be kept in the storage region as the "setting Bo" for the step below.

At the step S902, information for identifying the printing function limitation ("limitation A") and information on whether the relieving printing is to be done or not are generated from the printing authority token obtained from the SA server 402 by using the printing authority processing unit 705. The number of limitation items limited is calculated and saved in the work area as "n".

At the step S903, it is checked whether the number of valid limitation items ("n") becomes 0 or not. If the number is 0, the operation proceeds to the step S909; and if the number is not 0, the operation proceeds to the next step S904.

The step S904 is a step of creating the printing setting information to which one of the limitation items is applied. That is to say, the "setting B'" that is the limitation item "An" applied to the "setting B" is created in the work area.

The step S905 is a step of determining whether the printing setting information to which one of the limitation items created at the step S904 is applied as available for printing or not.

The previously created "setting B'" is subjected to the consistency determination processing by the consistency determination unit 503 at this step, and if it is determined as "it is consistent" as a result, the operation proceeds to the step S906; and if it is determined as "it is not consistent", the operation proceeds to the step S907.

As it is determined that the printing setting information created at the step S904 to which one of the limitation items is applied is consistent at the step S906, the processing for temporally making the setting the printing setting information is done.

That is to say, the contents of the "setting B'" are copied to the "setting B".

It is determined whether the abovementioned relieved printing processing is allowed or not at the step S907.

If the relieving processing previously obtained at the step S902 is allowed according to the determination, the operation proceeds to the step S908 and the printing processing is kept; and if it is not allowed, the operation proceeds to the step S910 and either the printing is stopped or the printing is kept by the imposing setting.

The processing for proceeding the limitation item to the next at the step S908.

That is to say, the value that 1 is subtracted from the value "n" is made a new "n" value and the operation returns to the step S903.

At the step S909, the drawing information issued by the application program 701 based on the printing setting information ("setting B") that is confirmed by the processing is converted into the data form (PDL) that the printer 403 can understand. The printing processing is kept as the data form is written in the system spooler 502.

Here, a message for notifying the setting item for the difference between the "setting Bo" and the "setting B", i.e., the setting item forced by the printing function limitation system may be displayed to the user.

At the step S910, the processing in the case where no valid setting can be built as the printing setting information as a result of the processing.

For example, a message indicating the fact that the limitation by the printing function limitation system prevents the printing may be displayed to the user and the processing for stopping the printing may be performed.

Alternatively, the printing setting information ("setting Ba") that reflects all the function limitation on the "setting Bo" is created, and the forced printing processing by using that as the printing setting information (The drawing information issued by the application program 701 is converted into the data form that the printer 403 can understand. Then, that is written into the system spooler 502.). Further, a message for notifying the difference setting item between the "setting Bo" and the "setting Ba", i.e., the setting item limited by the printing function limitation system may be displayed to the user.

The operations of the present invention in printing have been described.

An example of a representative functions implemented by the printer 403 and the printer driver 703 relating to the limitation example of the printing function shown in FIG. 10 is shown in FIG. 11.

How the limitation item of the printing function shown in FIG. 10 influences on the determination of the consistency determination unit 503 will be described below with a representative function taken as an example.

For the type of the media (the printing media), the duplex printing cannot be done on the media such as the OHP sheet or the cardboard due to the mechanism of the printer 403. That is to say, if the simplex printing is "not allowed" in the limitation system and if the type of the media is the OHP sheet or the cardboard, the consistency determination unit 503 determines that it is inconsistent. In other words, if the OHP sheet or the cardboard is set in the printing data and if the duplex printing setting is forced based on the printing authority information, the media cannot be printed. In such a case, warning is issued and the job is cancelled or the printing is kept by relieving the duplex printing.

The printing cannot be done on the media at a particular size or less or at another particular size or more due to the duplex printing mechanism of the printer 403. That is to say, if the one-way printing is set as "not allowed" in the limitation system and if the media size is at a particular size or less or at another particular size or more, the consistency determination unit 503 determines that it is inconsistent.

The bookbinding printing is a type of printing by which 2UP printing is done on both sides of the printing medium and the ejected media is folded into two at the center together to form a book. The order of pages is logically controlled in the bookbinding printing. The layout is fixed to 2UP and the printing side mode is fixed to the duplex printing in the bookbinding printing, respectively. That is to say, if the simplex printing is "not allowed" or if the layout is either "not allowed for 1UP" or "not allowed for 1 to 2 UP" in the limitation system, the consistency determination unit 503 determines that it is inconsistent.

The poster printing is a function of zooming up printing data of an input logical page, dividing the data into a plurality of physical pages, printing it on one side of the media, and gluing the printed physical pages to have a big image of the logical pages (such setting as 2×2, 3×3, 4×4 is general).

The poster printing can be categorized as 1/NUP (one $N^{th}$ UP). That is to say, if the simplex printing is "not allowed" or if the layout is either "not allowed for 1UP" or "not allowed for 1 to 2UP" in the limitation system, the consistency determination unit 503 determines that it is inconsistent. The simplex printing is allowed for the relieving printing.

Finally, a digital watermark function is a function of embedding an invisible image or pattern with particular information into a printing image. In order to make the image or pattern invisible, quite a thin color needs to be used in the color printing mode. That is to say, if the color printing is "not allowed" in the limitation system, the consistency determination unit 503 determines that it is inconsistent. The color printing is allowed in the relieving printing. Those mentioned above are merely examples, and they can be generally applied to the conflict rule relating to the competing setting.

Although processing of the relieving printing in the case where limitation of the printer 403 and the printer driver 703 prevents the printing has been described in the above embodiment, the limitation against the limitation system of the embodiment is neither limited to the limitation of the printer 403 nor limitation of the printer driver 703.

Figure 12:
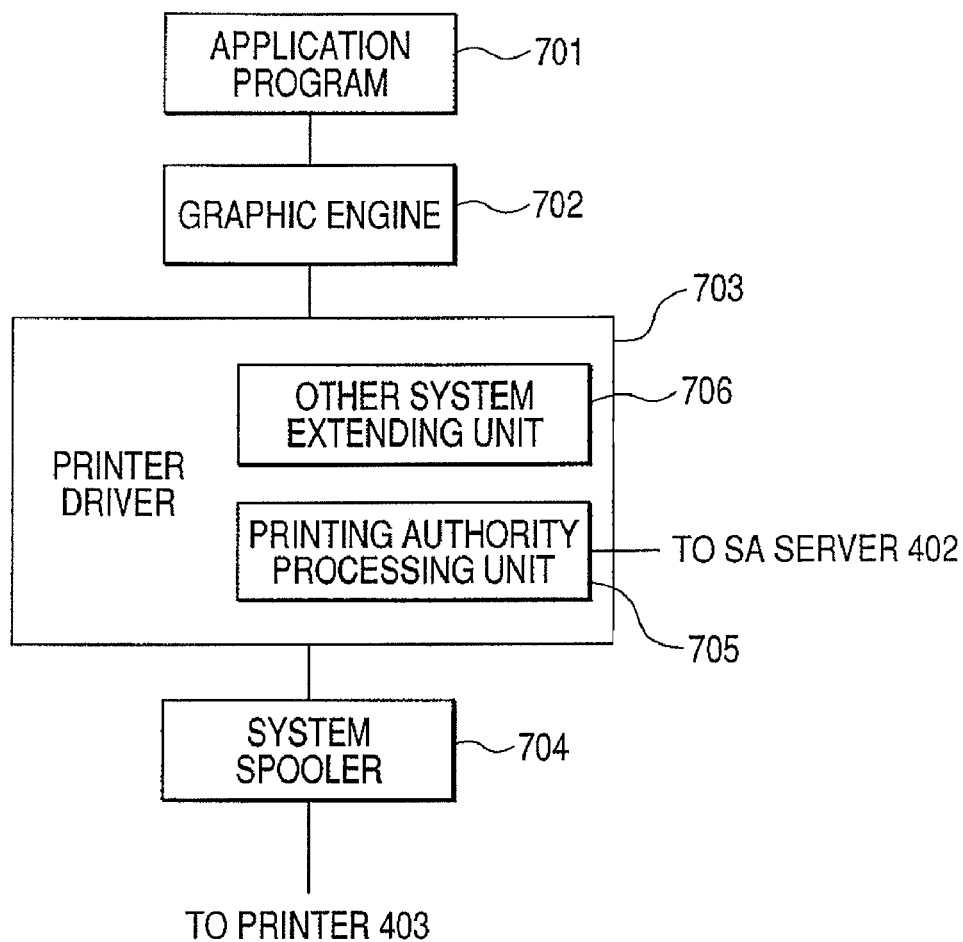
FIG. 12 is a block diagram illustrating a configuration in a host computer 401 in another embodiment of the present invention.

In the embodiment, the relieving printing processing of the limitation system of the present invention in the environment where another system for directly or indirectly limiting the printing function with the same intention as that of the limitation system or an intention quite different from the limitation system is operating will be described. FIG. 12 is a block diagram illustrating a configuration in the host computer 401 in the embodiment.

It has a configuration different from that of FIG. 7 in that another system extending unit 706 is added in the printer driver 703. That other system extending unit 706 may be a built-in module of the printer driver 703 or a form of a library module added along with an individual occasion of installation. That other system extending unit 706 performs an operation for changing the printing setting information in conjunction with the printer driver 701 for directly or indirectly limiting the printing function.

The other system extending unit 706 operates either or both of the step S801 of FIG. 8 and the step S901 of FIG. 9 for confirming the printing setting information according to the objects of the other system in conjunction of the consistency determination unit 503.

Figure 13:
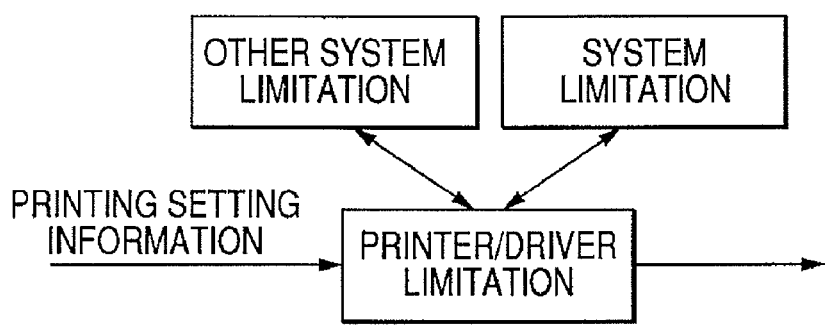
FIG. 13 is a block diagram illustrating processes of changing the printing setting information in another embodiment of the present invention.

FIG. 13 is a block diagram illustrating processes of changing the printing setting information in the embodiment.

A flow of the printing setting information will be described with reference to the drawings. First, the printing setting information created by the application program 701 is passed to the printer driver 703. Then, the printer driver 703 and the other system extending unit 706 of the other limiting system begin operating in conjunction with each other to create the printing setting information to which the other system limitation is applied. The created printing setting information becomes the confirmed printing setting information (setting B) at the step S801 of FIG. 8 and S901 of FIG. 9 to be dealt with by the limiting system of the present invention. Thereafter, the limitation of the limiting system including the relieving printing is applied for limiting the printing function as mentioned in the above embodiments.

As an example of the other system, a pattern printing function will be described. The printing setting information is forced to fix the printing resolution so that a pattern extremely depending on the resolution is drawn in the pattern printing.

Those mentioned here are merely examples, and any system may be used if only that imposes the printing setting information in conjunction with the printer driver 703 to achieve an object.

FIG. 14 shows an outline of anther embodiment. Some systems, do not guarantee that data with inconsistent setting is not sent like in FIG. 8 or 9. The printer 403 of FIG. 1 may be a complex machine. In the embodiment, the printer 403 in FIG. 4 corresponds to an image forming apparatus 1400. A communication line 1044 corresponds to that denoted by the reference numeral 406 of FIG. 4. The job sent from another computer may be with inconsistent setting. Even if the job has no inconsistent setting, the printing limitation is left to the apparatus. As shown in FIG. 1, the image forming apparatus 1400 has a printer controller unit 1040, an operation panel 1041 and a printer engine unit connected with the image input device. The operation panel 1041 is for informing the current state of the image forming apparatus, selecting the printing mode or issuing various instructions. The engine unit 1042 is for printing image data when the ink jet printer is implemented. The printer control unit 1040 includes a RAM 1401 in which a controlling program is loaded, where the controlling program stores various information such as a kind of an image input device that can be used, a version of the device, image processing information, a printing mode, a data processing method, an operation method and the like. The controlling program is stored in the rewritable nonvolatile ROM 1401. The controlling unit includes the CPU 1404 for controlling over the system by the information in the ROM 1401 and 1402. The RAM 1401 is also used for the purpose of an input buffer of work memory input data of the CPU 1404 and a printing buffer for printing data. The controller unit includes the engine interface 1406 for exchanging a command, a status or printing data with the engine 1042. The controller unit further includes a panel interface 1405 for exchanging with the operation panel 1041. The controller unit has an interface for data 1407 for sending/receiving data to/from the image input device 1043. It may connect with the communication line 1044 using the interface 1408 for sending/receiving data from outside may be a connection by a cable such as IEEE 1394 or a connection without using a cable like an infrared ray (IrDA). In the embodiment, a program for performing the same processing as that in FIG. 8 is stored in the nonvolatile ROM 1403. The program stored in the nonvolatile ROM runs the CPU 1404 for executing the processing of FIG. 8.

An instruction of indicating to allow or not to allow the relieving printing input via the user interface of the printer driver may be input from the operation panel 1041. The printing authority token is obtained by the communication I/F 1408 from the SA server via the communication line 1044. The contents of the setting for allowing the relieving printing may also be input from the operation panel 1041 to be written out to the RAM or the nonvolatile ROM. When the printer 401 processes the job, FIG. 8 is executed in the embodiment. First, the printing setting set for the job is confirmed and whether or not to allow the relieving printing stored in the abovementioned ROM or RAM is obtained at S802.

The processes after here are the same as those mentioned above. The CPU 1404 executes them under the installed controlling program. If the processing of FIG. 8 ends and a valid printing setting is present, the CPU 1404 processes the job data subjected to the processing of FIG. 8 by using the printing setting. The engine I/F 1406 sends to the engine 1042 a video signal corresponding to the bitmap data generated based on the job data, and the engine 1042 executes printing using the video signal.

Other Embodiments

Each of the processing functions in the host computer 401 and the printer 403 that executes such a function as that of FIGS. 8 and 9 in the abovementioned embodiment is for reading a program for implementing the processing functions from a memory so that the CPU (central processing unit) executes it to implement the function. The present invention is not limited to the embodiments. All or a part of the processing functions may be implemented by dedicated hardware. The abovementioned memory may be formed by a nonvolatile memory such as a magneto optical disk device, a flash memory and the like or a readable recording media that enables only to read out CD-ROM or the like. The memory may also be formed by a volatile memory other than the RAM or a computer readable and writable recording media by combinations of the volatile memories.

A program for implementing each of the functions in the host computer 401 and the authentication server 402 and the printer 403 is recorded in a computer readable recording medium. Then, each processing may be executed as a program recorded in the recording medium is read in the computer system to be executed. The term a "computer system" means to include an OS or hardware of a peripheral device and the like. Specifically, a program read out from a storage medium causes the program to be written on a function extending board inserted in a computer or a memory provided for a function extending unit connected to a computer. It also includes a case where a CPU or the like provided for the function extending board or the function extending unit performs all or a part of the actual processing based on an instruction of the program so that the processing implements functions of the abovementioned embodiment.

The term a "computer readable recording medium" means a portable medium such as a flexible disk, a magneto optical disk, a ROM, a CD-ROM and the like and a storage device such as hard disk included in a computer system. A program is sent via a network such as the Internet or a communication line such as a telephone line. In such a case, those keeping a program for a certain time such as a volatile memory (RAM) inside a computer system which serves as a server or a client are assumed to be included.

The abovementioned program may be transmitted from a computer system that stores the program in the storage device or the like to the other computer system via a transmission medium or by a transmission wave in the transmission medium. The "transmission medium" for transmitting the program means a medium with a function for transmitting information such as a network (a communication network) including the Internet or a communication line including a telephone line (a communication line).

The abovementioned program may be for implementing a part of the abovementioned functions. The abovementioned program may also be that implemented by a combination of the abovementioned functions and a program previously recorded in the computer system, i.e., a differential file (differential program).

The program product such as a computer readable recording medium recording the abovementioned program can also be applied as an embodiment of the present invention. The abovementioned program, recording medium, transmission medium and program product are included in the scope of the present invention.

As mentioned above, the host computer 401 and the printer 403 have been described as an example of the print controlling apparatus for controlling the printing processing by using the printing limitation information indicating the printing limitations.

The printing authority processing unit runs the CPU and obtains the printing limitation information.

The printing authority processing unit identifies the printing setting set in the printing data. The printing authority processing unit decides the printing setting by which the abovementioned printing setting is in the range of the printing authority information by using the identified printing setting and the printing authority information.

The printing authority processing unit 705 determines whether the decided printing setting is inconsistent with the other setting that is set to the printing data by using the consistency determination unit.

If it is determined as inconsistent, the printing authority processing unit allows the printing setting for the printing data outside the range of the printing authority information. The abovementioned processing is executed by the CPU inside the printer or the host computer.

The keyboard 104 and the operation panel 1041 are disclosed as examples of input unit for inputting whether or not to allow the printing setting for the printing data outside the range of the printing authority information.

Examples of the printing authority information include a token of FIG. 10. There is a case where that the printing setting for the printing data is not allowed outside the range is input by the input unit. In such a case, if the decided printing setting is inconsistent with the other setting set for the printing data, it is warned by using a monitor of FIG. 6, which is denoted by 1041 in FIG. 14 or electric mail information.

It further includes a registering unit for registering the printing setting in advance. If inconsistent setting is related with the printing setting registered by the registering unit, the printing authority processing unit may allow the printing setting outside the printing authority information set in the printing data. That is to say, if only relieving of the duplex printing is set as the relieving printing or the simplex printing allowed is set, the setting may be allowed. It is preferable that whether or not to allow the relieving printing can be instructed for each setting for the leftmost line of FIG. 11 in which confliction is set. It can relieve the controlled printing that enables setting for each.

If the determination unit determines as inconsistent in the case where setting relating to a poster, bookbinding, OHP, a cardboard, a digital watermark and a size of a medium is set and the other setting is changed, the printing authority processing unit may allow it even if it is outside the range of the authority information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-098004 filed on Mar. 31, 2006, which is hereby incorporated by reference herein in its entirety.

What is claimed is:

1. A print controlling apparatus for controlling printing processing by using a printing right token in which printing limitation information is defined to force a user to use a predetermined printing setting, the apparatus comprising:

an inputting unit for inputting an exceptional condition in which printing of image data is forced to be executed in a color print mode when the image data includes a digital watermark even if the predetermined printing setting defines a forced-monochrome-printing setting in which printing is forced to be executed in a monochrome print mode;

a determination unit for determining whether a conflict occurs between the forced-monochrome-printing setting defined by the predetermined printing setting and a printing setting defined by the exceptional condition input by said inputting unit, wherein said determination unit determines that a conflict occurs if a print instruction is given for image data including a digital watermark when the predetermined printing setting defines the forced-monochrome-printing setting; and an executing unit for executing printing of the image data including a digital watermark in the color print mode, if the determination unit determines that the conflict occurs, even when the predetermined printing setting defines the forced-monochrome-printing setting.

2. A method for a print controlling apparatus for controlling printing processing by using a printing right token in which printing limitation information is defined to force a user to use a predetermined printing setting, the method comprising:

an inputting step of inputting an exceptional condition in which printing of image data is forced to be executed in a color print mode when the image data includes a digital watermark even if the predetermined printing setting defines a forced-monochrome-printing setting in which printing is forced to be executed in a monochrome print mode;

a determining step of determining whether a conflict occurs between the forced-monochrome-printing setting defined by the predetermined printing setting and a printing setting defined by the exceptional condition input in said inputting step, wherein said determination unit determines that a conflict occurs if a print instruction is given for image data including a digital watermark when the predetermined printing setting defines the forced-monochrome-printing setting; and an executing step of executing printing of the image data including a digital watermark in the color print mode, if it is determined in the determining step that the conflict occurs, even when the predetermined printing setting defines the forced-monochrome-printing setting.

3. A computer-readable medium storing a computer program for a print controlling apparatus for controlling printing processing by using a printing right token in which printing limitation information is defined to force a user to use a predetermined printing setting, the program comprising:

an inputting step of inputting an exceptional condition in which printing of image data is forced to be executed in a color print mode when the image data includes a digital watermark even if the predetermined printing setting defines a forced-monochrome-printing setting in which printing is forced to be executed in a monochrome print mode;

a determining step of determining whether a conflict occurs between the forced-monochrome-printing setting defined by the predetermined printing setting and a printing setting defined by the exceptional condition input by said inputting unit. wherein said determination unit determines that a conflict occurs if a print instruction is given for image data including a digital watermark when the predetermined printing setting defines the forced-monochrome-printing setting; and an executing step of executing printing of the image data including a digital watermark in the color print mode, if it is determined in the determining step that the conflict occurs, even when the predetermined printing setting defines the forced-monochrome-printing setting.

* * * * *